(12) United States Patent
Marks et al.

(10) Patent No.: US 10,936,294 B2
(45) Date of Patent: Mar. 2, 2021

(54) BLOCKCHAIN-BASED SOFTWARE COMPLIANCE SYSTEM

(71) Applicant: Dell Products L.P., Round Rock, TX (US)

(72) Inventors: Kevin T. Marks, Georgetown, TX (US); Viswanath Ponnuru, Karnataka (IN); Ravikanth Chaganti, Karnataka (IN); Raveendra Babu Madala, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/178,030

(22) Filed: Nov. 1, 2018

(65) Prior Publication Data

US 2020/0142681 A1 May 7, 2020

(51) Int. Cl.
*G06F 8/65* (2018.01)
*G06F 11/34* (2006.01)
*G06F 11/30* (2006.01)
*G06F 16/23* (2019.01)

(52) U.S. Cl.
CPC .............. *G06F 8/65* (2013.01); *G06F 11/302* (2013.01); *G06F 11/3495* (2013.01); *G06F 16/2379* (2019.01)

(58) Field of Classification Search
CPC ...... G06F 8/65; G06F 16/2379; G06F 11/302; G06F 11/3495
See application file for complete search history.

(56) References Cited

U.S. PATENT DOCUMENTS

| 10,666,767 | B1* | 5/2020 | Floyd ................ H04L 9/3239 |
| 2014/0123124 | A1 | 5/2014 | Gray et al. |
| 2014/0279985 | A1* | 9/2014 | Fontenot ............. G06F 21/51 |
| | | | 707/698 |
| 2016/0275461 | A1 | 9/2016 | Sprague et al. |

(Continued)

OTHER PUBLICATIONS

Michael Mylrea et al., "Blockchain for Supply Chain Cybersecurity,Optimization and Compliance," 2018 [retrieved on Nov. 4, 2020], 2018 Resilience Week (RWS), pp. 70-76, downloaded from <url>:https://ieeexplore.ieee.org. (Year: 2018).*

*Primary Examiner* — S. Sough
*Assistant Examiner* — Stephen D Berman
(74) *Attorney, Agent, or Firm* — Haynes and Boone, LLP

(57) ABSTRACT

A blockchain-based software compliance system includes a computing system with a first computing device associated with first software. A monitoring system detects an update of the first computing device to replace the first software with second software, and generates a blockchain transaction that is directed to a blockchain address and that identifies the replacement of the first software with the second software. The monitoring system broadcasts the blockchain transaction, which is received by a blockchain device that executes a smart contract associated with the blockchain address. The blockchain device then determines that the execution of the smart contract has provided an indication that the updating of the first computing device with the second software does not comply with a computing system software matrix and, in response, causes an update to the first computing device that replaces the second software with third software that complies with the computing system software matrix.

20 Claims, 6 Drawing Sheets

(56) References Cited

U.S. PATENT DOCUMENTS

2018/0088928 A1* 3/2018 Smith ..................... H04L 67/34
2018/0176229 A1* 6/2018 Bathen ..................... G06F 8/65
2019/0394046 A1* 12/2019 Su ............................ G06F 8/65

* cited by examiner

BLOCKCHAIN-BASED SOFTWARE COMPLIANCE SYSTEM

BACKGROUND

The present disclosure relates generally to information handling systems, and more particularly to ensuring software compliance in an information handling system via a blockchain.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided in computing systems called "computing solutions" that include one or more server devices, storage devices, switch devices, and/or other computing devices that may be provided in a rack and configured to operate with each other in a desired manner. The configuration of the computing devices to operate in a desired manner typically includes the provisioning of particular software, such as particular firmware and/or particular drivers (e.g., operating system drivers), that provide for the optimal functionality and performance of each of the computing devices in the computing solution with each other. The optimal functionality and performance of the computing devices in the computing solution often requires that each of those computing devices comply with particular software requirements (e.g., particular firmware and/or drivers) so that each of the computing devices operate together in an integrated manner to enable the desired computing solution functionality. As such, the computing solution provider often validates a computing solution software matrix (identifying validated firmware and/or drivers for each of those computing devices) that defines the particular software that may be utilized with each of the computing devices in the computing solution to provide the optimal interoperability, functionality, and performance.

As such, interoperability, functionality, and performance of computing solutions like those discussed above can be negatively impacted if software on any of the computing devices does not comply with the computing solution software matrix. For example, when a switch element (e.g., a network card) does not comply with the computing solution software matrix (e.g., by utilizing a driver that is not included in the computing solution software matrix), one or more of the computing devices in the computing solution (e.g., the server devices, storage devices, switch devices) may operate sub-optimally, which can then result in support costs for the computing solution provider. Deviations by the computing solution from the computing solution software matrix often occur when a network administrator or other user performs an out-of-band software update on a computing device or computing device component in the computing solution, which results in the use of software on that computing device that is not included in the computing solution software matrix, and can result in a change in the cross-dependencies between the computing devices or computing device components that impacts the interoperability, functionality, and performance of the computing solution.

Accordingly, it would be desirable to provide a software compliance system.

SUMMARY

According to one embodiment, an Information Handling System (IHS) includes a blockchain device that is coupled to a network and that includes: a blockchain device processing system; and a blockchain device memory system that is coupled to the blockchain device processing system and that includes instructions that, when executed by the blockchain device processing system, cause the blockchain device to: receive a blockchain transaction that was broadcast by a monitoring system in response to an update of a first computing device in a computing system to replace first software associated with the first computing device with second software; execute a smart contract that is associated with a blockchain address that is included in the blockchain transaction; and determine that the execution of the smart contract has provided an indication that the second software that replaced the first software to update the first computing device does not comply with a computing system software matrix and, in response, cause an update to the first computing device that replaces the second software with third software that complies with the computing system software matrix.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
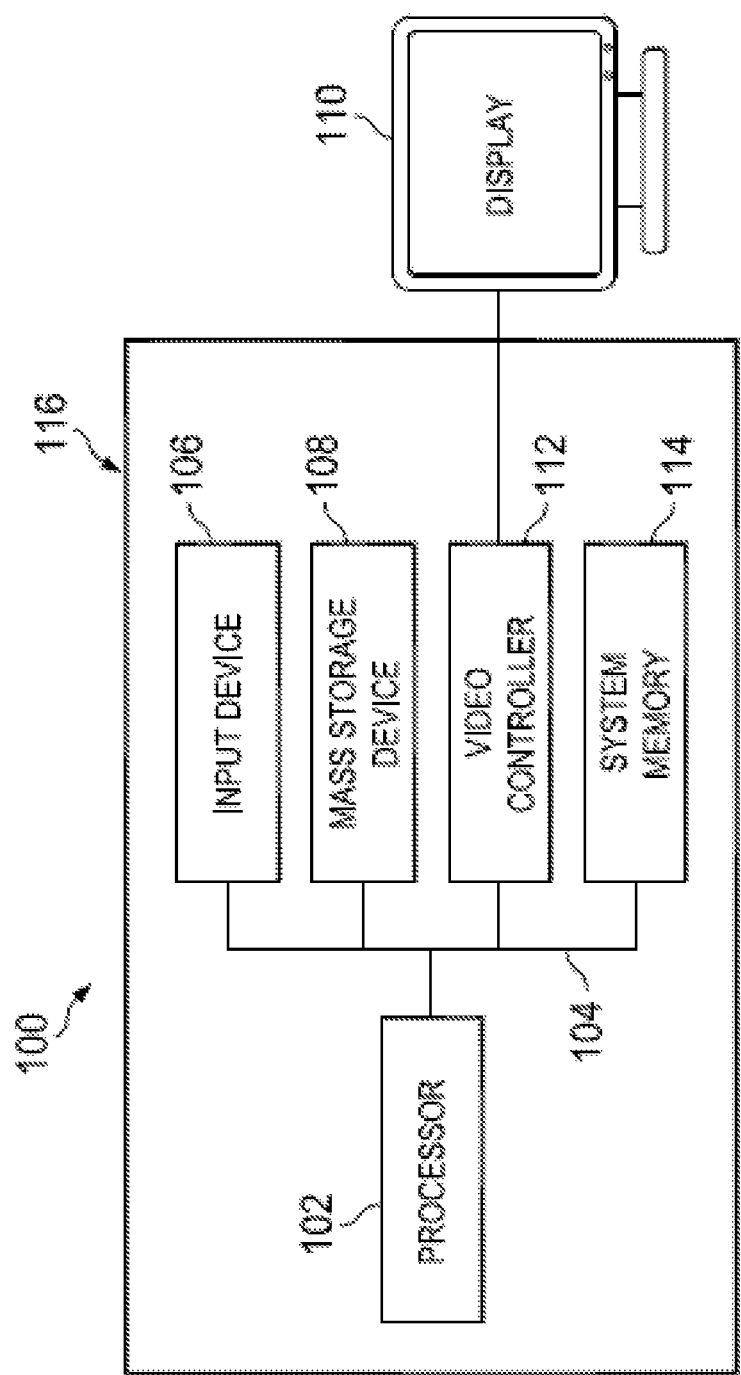
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
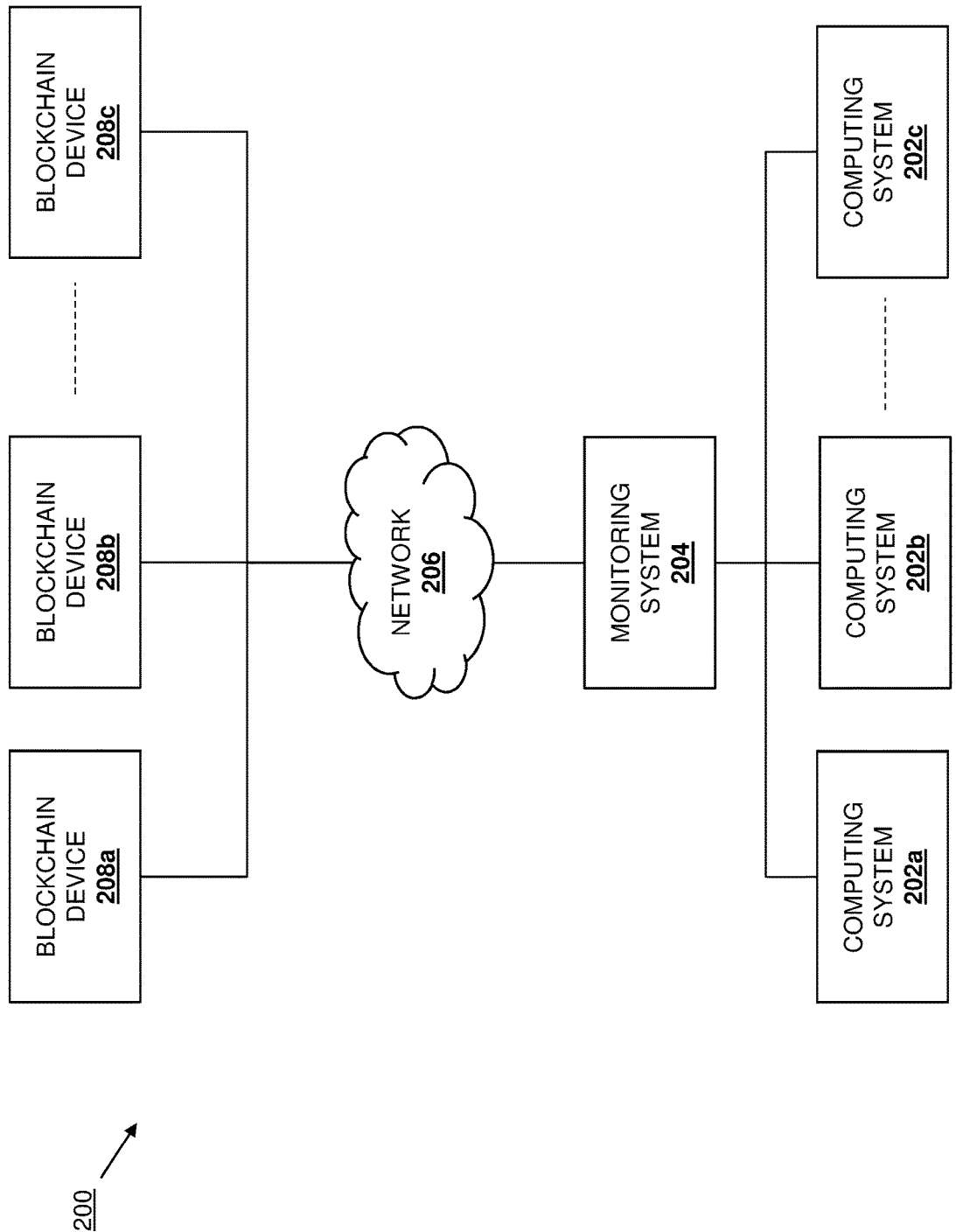
FIG. 2 is a schematic view illustrating an embodiment of a blockchain-based software compliance system.

Referring now to FIG. 2, an embodiment of a blockchain-based software compliance system 200 is illustrated. In the embodiments discussed below, the blockchain-based software compliance system 200 is controlled by a single entity such as, for example, an operator, owner, and/or controller of a datacenter or Local Area Network (LAN) that operates, owns, and/or controls each of the devices, systems, and network that provide the functionality of the blockchain-based software compliance system 200. For example, many datacenters provide one or more physical locations at which plurality of computing systems are connected via a network, and such datacenters may utilize the teachings of the present disclosure to ensure software compliance for those computing systems in the manner described below. However, one of skill in the art in possession of the present disclosure will recognize that separate control (or cooperate control by a plurality of entities) of one or more of the devices, systems, and network that provide the functionality of the blockchain-based software compliance system 200 will fall within the scope of the present disclosure as well In the illustrated embodiment, the blockchain-based software compliance system 200 includes a plurality of computing systems 202a, 202b, and up to 202c. In an embodiment, any or all of the computing systems 202a-c may be provided by the IHS 100 discussed above with reference to FIG. 1, and/or may include some or all of the components of the IHS 100. In specific examples, each of the computing systems 202a-c may include server device(s), storage device (s), and networking device(s) provided in, for example, a rack or other computing systems chassis. As discussed above, some computing systems are provided as "computing solutions" by computing solution providers, and includes the computing devices discussed above operating as an integrated system via the configuration of each of those computing devices with particular software (e.g., particular firmware and/or particular drivers (e.g., operating system drivers)) that provides for the optimal functionality and performance of each of the computing devices in the computing system with each other. However, in other embodiments, the computing systems 202a-c may be provided by desktop computing devices, laptop/notebook computing devices, tablet computing devices, and/or any other computing systems that would be apparent to one of skill in the art in possession of the present disclosure.

Each of the computing systems 202a-c is coupled to a monitoring system 204 that may be provided by the IHS 100 discussed above with reference to FIG. 1, and/or may include some or all of the components of the IHS 100. In specific examples, the monitoring system 204 may be provided by an OpenManage Essential (OME) management console that is available from DELL® Inc. of Round Rock, Tex., United States, and that is configured to provide for the deployment of server devices, operating systems, and updates; the maintenance of policy-based configuration profiles; template driven network setup and management; and/ or other functionality that would be apparent to one of skill in the art in possession of the present disclosure. However, the monitoring system 204 may be provided by a variety of other configuration management devices or systems that provide system monitoring and provisioning, the deployment of server devices, operating systems, and updates, the maintenance of policy-based configuration profiles, and/or other functionality while remaining within the scope of the present disclosure as well. Furthermore, in other embodiments, the functionality of the monitoring system 204 may be integrated into one or more of the computing systems 202a-c while remaining within the scope of the present disclosure as well. In the illustrated embodiment, the monitoring system 204 is coupled to a network 206 which, as discussed above, may be provided by a LAN in a datacenter in the examples below. However, other types of networks (e.g., the Internet) may be utilized in the blockchain-based software compliance system 200 while remaining within the scope of the present disclosure as well.

In the illustrated embodiment, a plurality of blockchain devices 208a, 208b, and up to 208c are also coupled to the network 206. In an embodiment, any or all of the blockchain devices 208a-c may be provided by the IHS 100 discussed above with reference to FIG. 1, and/or may include some or all of the components of the IHS 100. In specific examples, the blockchain devices 208a-c may include one or more server devices and/or other blockchain maintaining computing devices that would be apparent to one of skill in the art in possession of the present disclosure. As discussed above, in some examples, the blockchain devices 208a-c may be provided in a datacenter an controlled by one or more entities to maintain a "private/centralized blockchain" that provides the functionality discussed below. However, in other examples, the blockchain devices 208a-c may be in any of a variety of locations, coupled to the Internet, and controlled by unrelated entities to maintain a "public/decentralized blockchain" that provides the functionality discussed below. While a specific blockchain-based software compliance system 200 has been illustrated and described, one of skill in the art in possession of the present disclosure will recognize that the functionality of the blockchain-based software compliance system of the present disclosure may be enabled by a variety of devices and/or systems in a variety of configurations that will fall within the scope of the present disclosure as well.

Figure 3:
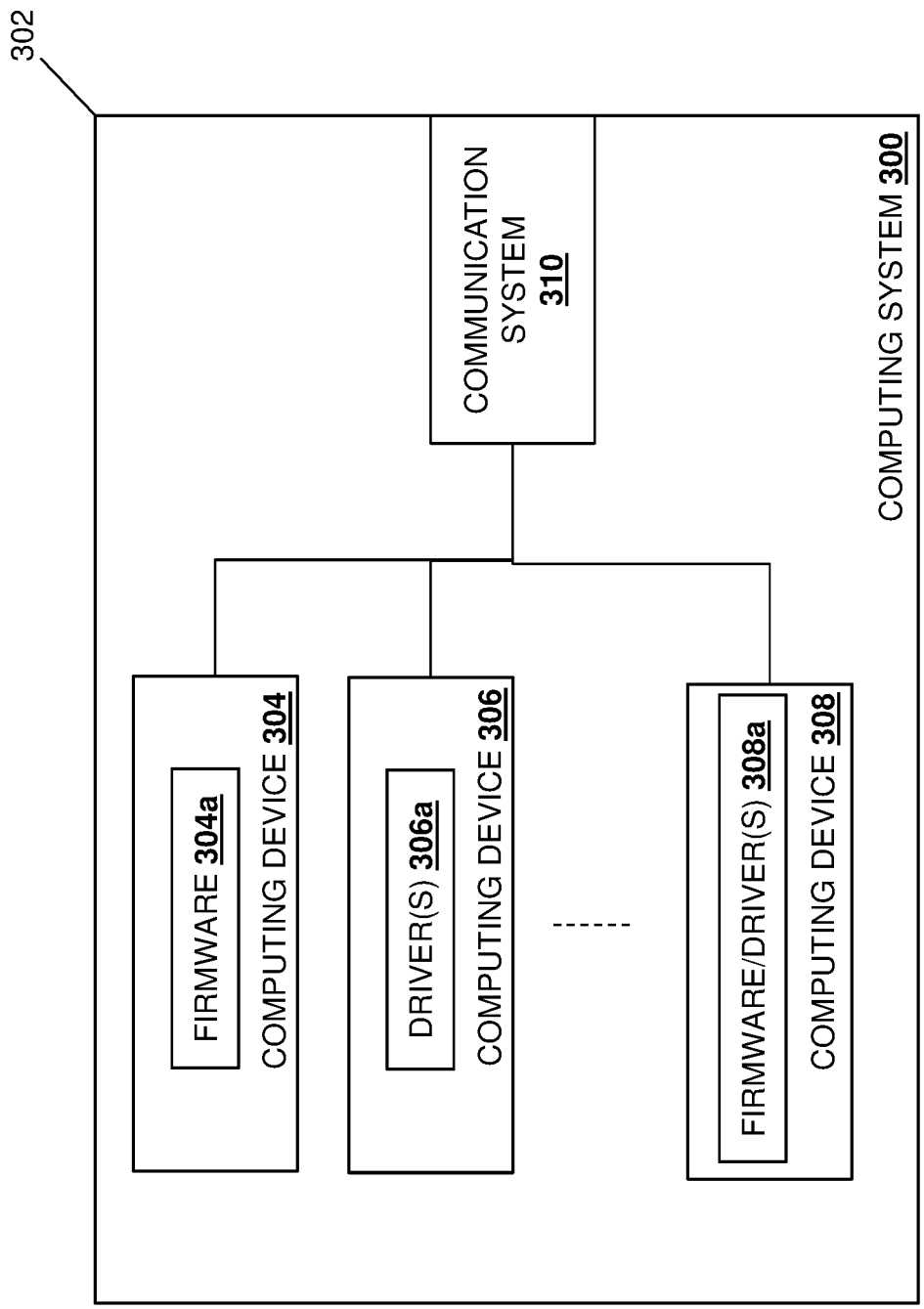
FIG. 3 is a schematic view illustrating an embodiment of a computing system used in the blockchain-based software compliance system of FIG. 2.

Referring now to FIG. 3, an embodiment of a computing system 300 is illustrated that may provide any or all of the computing systems 202a-c discussed above with reference to FIG. 2. As such, the computing system 300 may be the IHS 100 discussed above with reference to FIG. 1 and/or may include some or all of the components of the IHS 100, and in specific examples may include server device(s), storage device(s), and networking device(s) provided in, for example, a rack or other computing systems chassis that would be apparent to one of skill in the art in possession of the present disclosure. In the illustrated embodiment, the computing system 300 includes a chassis 302 that houses the components of the computing system 300, only some of which are illustrated in FIG. 3. For example, the chassis 302 may be a rack that houses a plurality of computing devices such the computing devices 304, 306, and up to 308 illustrated in FIG. 3. Furthermore, any or all of the computing devices in the computing system 300 may be associated with firmware and/or drivers such as the firmware 304a associated with the computing device 304, the driver 306a associated with the computing device 306, and the firmware and driver 308a associated with the computing device 308. In the examples below, the computing device 306 may be a networking device in the computing system, and the driver 306a is associated with the computing device 306 via its provisioning with a computing component in the computing device 306 provided by a network card. However, one of skill in the art in possession of the present disclosure will recognize that the computing devices may be provided in desktop computing devices, laptop/notebook computing devices, tablet computing devices, and/or any other computing systems known in the art, and the software associated with those computing devices may be any firmware, drivers, or other software known in the art as well.

The chassis 302 may also house a communication system 310 that is coupled to each of the computing devices 304, 306, and 308, and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 206 of FIG. 2) discussed below. However, while a specific computing system 300 has been illustrated and described, one of skill in the art in possession of the present disclosure will recognize that computing systems may include a variety of components and component configurations that would enable the functionality discussed below while remaining within the scope of the present disclosure.

Figure 4:
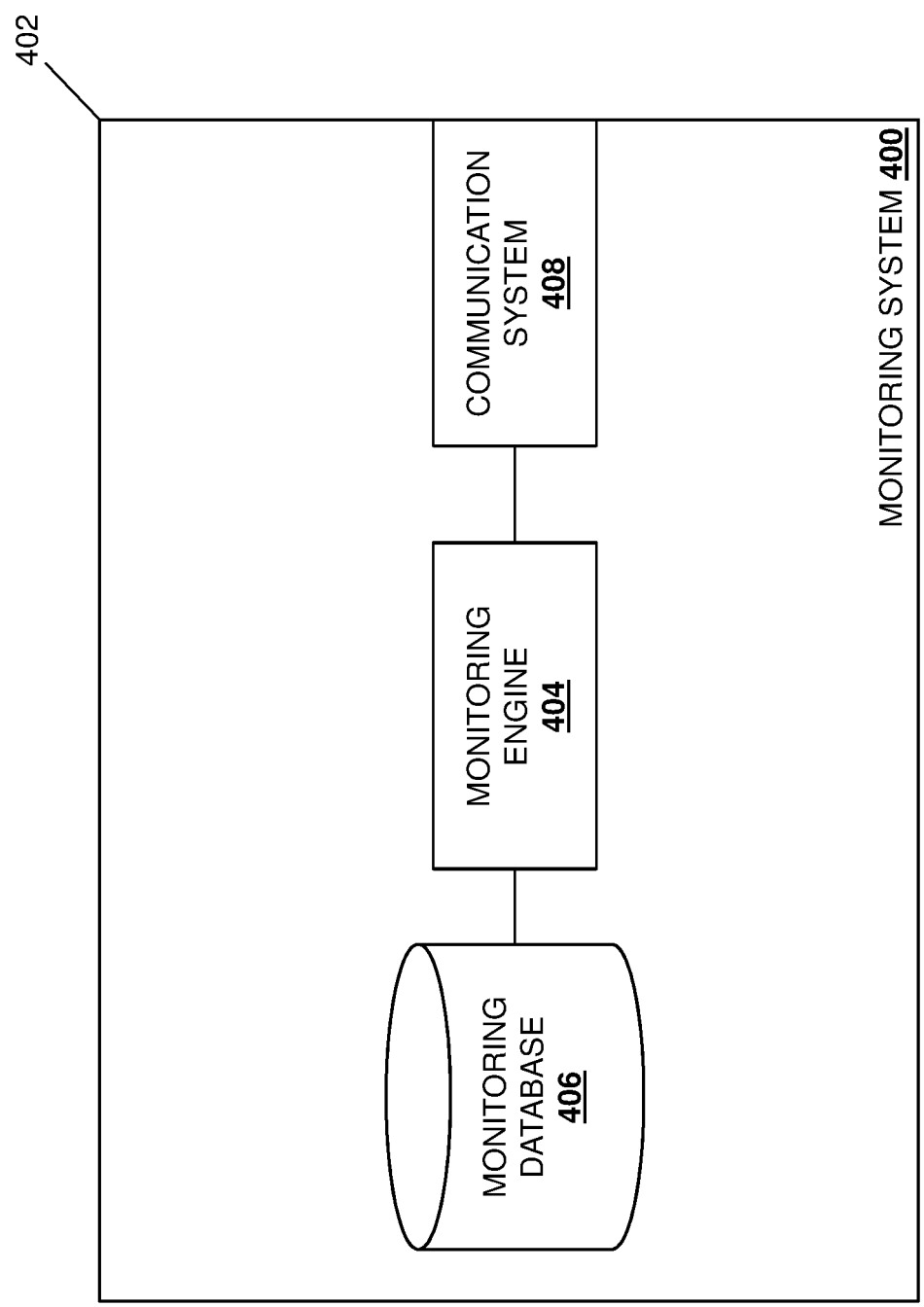
FIG. 4 is a schematic view illustrating an embodiment of a monitoring system used in the blockchain-based software compliance system of FIG. 2.

Referring now to FIG. 4, an embodiment of a monitoring system 400 is illustrated that may provide the monitoring system 204 discussed above with reference to FIG. 2. As such, the monitoring system 204 may be the IHS 100 discussed above with reference to FIG. 1 and/or may include some or all of the components of the IHS 100, and in specific examples may be provided by the OME management console discussed above. In the illustrated embodiment, the monitoring system 400 includes a chassis 402 that houses the components of the client device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a monitoring engine 404 that is configured to perform the functionality of the monitoring engines and monitoring systems discussed below.

Figure 5:
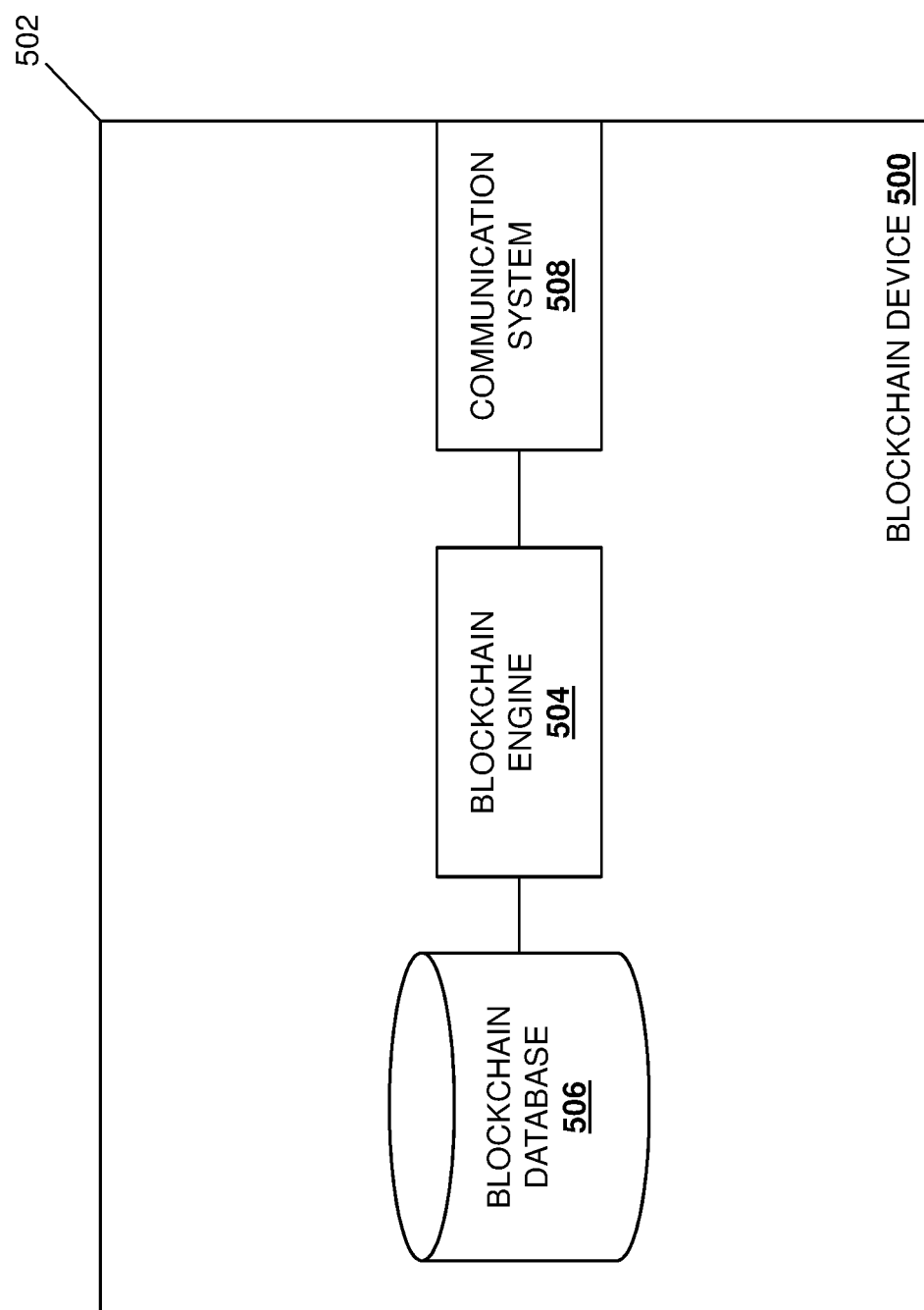
FIG. 5 is a schematic view illustrating an embodiment of a blockchain device used in the blockchain-based software compliance system of FIG. 2.

The chassis 402 may also house a storage system (not illustrated, but which may include the storage device 108 discussed above with reference to FIG. 1) that is coupled to the monitoring engine 404 (e.g., via a coupling between the storage system and the processing system) and that includes a monitoring database 406 that is configured to store any of the data and/or other information utilized by the monitoring engine 404 as described below. The chassis 402 may also house a communication system 408 that is coupled to the monitoring engine 404 (e.g., via a coupling between the communication system 408 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 206 of FIG. 2) discussed below. However, while a specific monitoring system 400 has been illustrated and described, one of skill in the art in possession of the present disclosure will recognize that monitoring systems may include a variety of components and component configurations that would enable the functionality discussed below while remaining within the scope of Referring now to FIG. 5, an embodiment of a blockchain device 500 is illustrated that may provide any or all of the blockchain devices 208a-c discussed above with reference to FIG. 2. As such, the blockchain device 500 may be the IHS 100 discussed above with reference to FIG. 1 and/or may include some or all of the components of the IHS 100, and in specific examples may be provided by server devices and/or other blockchain maintaining computing devices that would be apparent to one of skill in the art in possession of the present disclosure. In the illustrated embodiment, the blockchain device 500 includes a chassis 502 that houses the components of the blockchain device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a blockchain engine 504 that is configured to perform the functionality of the blockchain engines and blockchain devices discussed below. As discussed above, in some examples, the blockchain engine 504 in the blockchain device 500 may be configured to maintain a "centralized blockchain" that is controlled by one or more entities, while in other examples, the blockchain engine 504 in the blockchain device 500 may be configured to maintain a "decentralized blockchain" that is controlled by unrelated and/or uncooperating entities.

The chassis 502 may also house a storage system (not illustrated, but which may include the storage device 108 discussed above with reference to FIG. 1) that is coupled to the blockchain engine 504 (e.g., via a coupling between the storage system and the processing system) and that includes a blockchain database 506 that is configured to store any of the data and/or other information utilized by the blockchain engine 504 as described below. The chassis 502 may also house a communication system 508 that is coupled to the blockchain engine 504 (e.g., via a coupling between the communication system 508 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 206 of FIG. 2) discussed below. However, while a specific blockchain device 500 has been illustrated and described, one of skill in the art in possession of the present disclosure will recognize that blockchain devices may include a variety of components and component configurations that would enable the functionality discussed below while remaining within the scope of the present disclosure.

Figure 6:
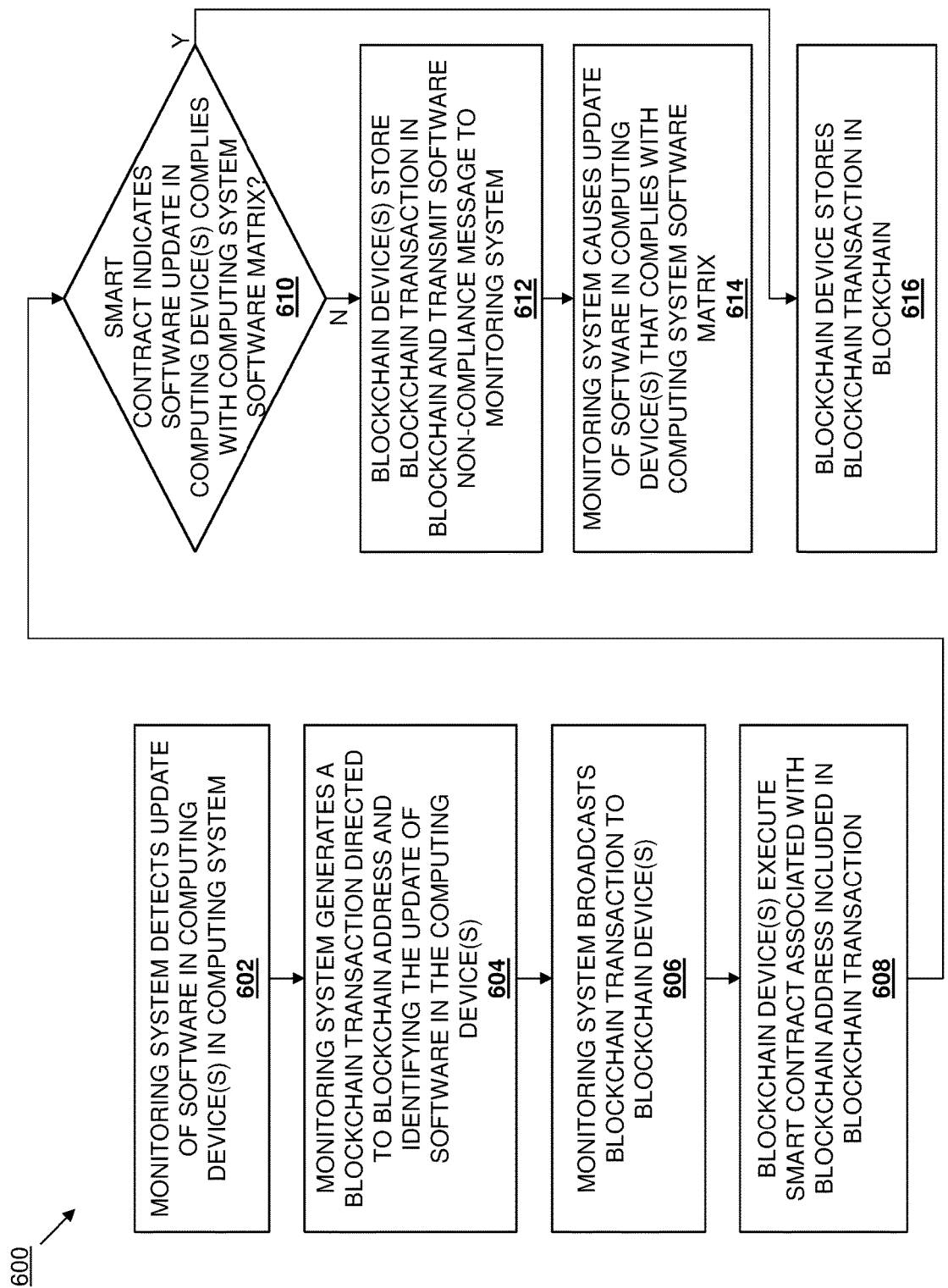
FIG. 6 is a flow chart illustrating an embodiment of a method for providing blockchain-based software compliance.

Referring now to FIG. 6, an embodiment of a method 600 for ensuring blockchain-based software compliance is illustrated. As discussed below, the systems and methods of the present disclosure provides blockchain-based smart contracts for use in ensuring computing devices in a computing system/solution comply with a computing solution software matrix that ensures optimal interoperability, functionality, and performance of the computing solution. This is accomplished, at least in part, by a monitoring device that detects when computing device(s) in the computing system/solution experience a software update. In response, the monitoring device will generate and broadcast a blockchain transaction that identifies the software update provided on the computing device(s), and that is directed to a blockchain address that is associated with a smart contract that has been provided on a blockchain in order to ensure software compliance for that computing system/solution. Blockchain device(s) receiving that blockchain transaction will then access and execute the smart contract associated with the blockchain address, and determine whether the execution of that smart contract indicates that the software update of the computing device(s) in the computing system/solution complies with the computing solution software matrix. If the software update of the computing device(s) in the computing system/solution does not comply with the computing solution software matrix, the blockchain device may cause the computing device(s) to be updated with different software that complies with the computing solution software matrix. As such, the optimal interoperability, functionality, and performance of the computing solution is maintained.

The method 600 begins at block 602 where a monitoring system detects an update of software in computing device(s) in a computing system. In an embodiment, prior to the method 600, any of the computing devices 304-308 in the computing system 300 (which may be any or all of the computing systems 202-a) may be provided with respective first software that complies with a computing system software matrix. For example, the computing system 300 may be a computing solution that may be provided in a rack in a datacenter, and that includes the computing devices 304-308 provided by server device(s), storage device(s), and networking device(s), each which may include one or more computing components (e.g., the network card provided in the networking device described below) that has first software provided by the computing system software matrix. However, in other embodiments, the computing system may be, for example, a desktop computing system, laptop/notebook computing system, etc., that includes computing components are provided with the first software in substantially the same manner while remaining within the scope of the present disclosure as well.

As discussed above, such computing systems/solutions may be provided by a computing solution provider that generates a computing system/solution software matrix that identifies validated firmware and/or driver(s) for each of its computing devices and/or computing components, and that computing system/solution software matrix defines the particular software (which may include a single set of software, different combinations of software, etc.) that may be utilized with each of the computing devices (e.g., with each of the computing components in those computing devices in the datacenter embodiment, or with each of the computing components in the computing system in the desktop/laptop/notebook computing device embodiment) in the computing system solution to provide the optimal interoperability, functionality, and performance for the computing system/solution. However, while a specific computing system/solution software matrix has been described, one of skill in the art in possession of the present disclosure will recognize that a computing system/solution software matrix according to the teachings of the present disclosure may identify any combination of software (e.g., firmware, drivers, and/or other software that would be apparent to one of skill in the art in possession of the present disclosure) for different computing devices/component in a computing system that defines a desired interoperability, functionality, and performance for a computing system/solution via the operation of its computing devices/computing components.

Furthermore, prior to the method 600, an administrator of the blockchain-based software compliance system 200, the computing system/solution provider, and/or other entities may provide a smart contract on a blockchain that is maintained by the blockchain devices 208a-c in the blockchain-based software compliance system 200. As would be understood by one of skill in the art in possession of the present disclosure, the blockchain devices 208a-c may operate to maintain a blockchain utilized in the blockchain-based software compliance system 200 by receiving blockchain transactions broadcast by the monitoring system 204 in the blockchain-based software compliance system 200, validating those blockchain transactions in "blocks" that include a plurality of blockchain transactions, and then appending those blocks to the blockchain (i.e., to blocks that were previously appended to the blockchain.) Furthermore, one of skill in the art in possession of the present disclosure will recognize that the appending of blocks to the blockchain may be accomplished via proof-of-methods, proof-of-stake methods, and/or other block verification and appending methods known in the art. As such, the smart contract utilized in the blockchain-based software compliance system 200 may be provided on the blockchain in a blockchain transaction that is broadcast by an administrator device, computing system/solution provider device, etc. (not illustrated) that is coupled to the network 206, with that blockchain transaction directed to a blockchain address included on that blockchain. In a specific example, code that provides the smart contract utilized in the blockchain-based software compliance system 200 may include the following:

```
function IdentityComplianceContract {
if (!account.valid( ))
        console.log("Invalid Account");
        return error_status;
    if (!account.isAuthorized( ))
        console.log("Not Authorized to perform solution deployment");
        return error_status
    if(!configProfile.context(enterpriseSecurityProfile.context( )))
        console.log("Security violation, Not authorized to perform solution deployment"):
        return error_status;
    return SUCCESS;
}
function SolutionComplianceContract {
        identityStatus = IdentityComplianceContract ( );
        if (!IdentityStatus )
            return IdentityStatus;
        nodesList[ ] = readInventoryManagedNodes( );
        computeNode - nodesList[n];
        computeNode.fw.iDRAC.version="9.5";
        computeNode.fw.QLogic414262.version="3.0";
        networkNode = nodesList[n++];
        networkNode.fw.ID="S41480";
        networkNode.fw.version="1.20.45a";
        storageNode.fw.version="5.6.x";
        storageNode.fw.PERC="9.2";
        ...
        if (initialOnBoarding)
            console.log("onboarding action grant access");
            grantAccessToOnBoarding( );
        if(!initial OnBoarding && checkSolutionCompliances( )))
            grantAccessToUpdate( );
        else
            console.log("Compliance violation! Unauthorized changes not allowed!"):
            return error_status;
        return true;
}
```

One of skill in the art in possession of the present disclosure will recognize that code, such as the example code provided for the smart contract above, may be included in a blockchain transaction that is directed to a blockchain address (and that may include an amount of cryptocurrency required to have the blockchain devices validate that blockchain transaction), and blockchain devices receiving that blockchain transaction will then validate that blockchain transaction and add the code to the blockchain in association with that blockchain address in order to provide the smart contract on the blockchain (i.e., in association with that blockchain address.) As such, as discussed in further detail below, subsequent blockchain transactions that are directed to that blockchain address and received by the blockchain devices will cause those blockchain devices to execute that code/smart contract. While one of skill in the art in possession of the present disclosure will appreciate that the example code provided for the smart contract above is relatively simple code that provides for the identification of a computing system/solution compliance contract, the compliance of software on that computing system/solution with a computing system software matrix, and the generation of a software non-compliance message, but smart contracts according to the teachings of the present disclosure may include code that provides for a variety of functionality (including the blockchain-device-caused-software-updates discussed below) that will fall within the scope of the present disclosure as well.

As such, the smart contract(s) associated with computing systems/solutions may be provided by the network administrator/computing system/solution provider in association with respective blockchain addresses in a blockchain for each computing system/solution for which software compliance is to be enforced. For example, a computing system/ solution provide may manufacture a plurality of different computing systems/solutions that are each associated with a different computing system/solution software matrix that provides for the optimal functionality of that computing system/solution, and a smart contract according to the teachings of the present disclosure may be provided on the blockchain for each of those computing systems/solutions substantially as described above. As such, in some embodiments, a smart contract may be created for a mass produced computing system/solution that is provided across a number of different customers, and software compliance for the computing devices in that computing system/solution may be enforced as discussed above. Furthermore, any update to the computing system/solution software matrix for that computing system/solution may result in a new smart contract being created and provided on the blockchain (as discussed above) in order to enforce software compliance according to that computing system/solution software matrix in the manner discussed below. However, while the systems and methods of the present disclosure may be particularly beneficial for mass produced computing systems/solutions provided across different customers, computing systems/solutions provided to a single customer may have smart contracts created and provided on a blockchain as discussed above while remaining within the scope of the present disclosure as well.

In an embodiment, at block 602, one or more of the computing devices 304-308 may have its software updated by, for example, having first software that provides the firmware 304a in the computing device 304 replaced with second software that is different than the first software (e.g., that provides a new version of the firmware 304a, that provides different firmware, etc.) Similarly, first software that provides the driver(s) 306a in the computing device 306 may be replaced with second software that is different than the first software (e.g., that provides a new version of the driver(s) 306*a*, that provides different drivers, etc.), and first software that provides the firmware/driver(s) 308*a* in the computing device 308 may be replaced with second software that is different than the first software (e.g., that provides a new version of the firmware/driver(s) 308*a*, that provides different drivers, etc.) The updating of any of the computing device(s) 304-308 at block 602 may be performed by a network administrator, by the computing device itself (e.g., via an automated process), and/or in a variety of other manners that would be apparent to one of skill in the art, and in some examples may utilize second software that complies with the computing system/solution software matrix (e.g., via an in-band software update of any or all of the computing devices 304-308 the computing system 300 that may be directed by an entity with knowledge of the computing system/solution software matrix), while in other examples may utilize second software that does not comply with the computing system/solution software matrix (e.g., via an out-of-band software update of any or all of the computing devices 304-308 the computing system 300 that may be directed by an entity without knowledge of the computing system/solution software matrix.)

At block 602, the monitoring engine 404 in the monitoring system 400 may detect, via its communication system 408, the update of any of the computing device 304-308 in the computing system 300 that provides for the replacement of first software provided on the computing device(s) 304-308 with second software. For example, each of the computing devices 304-308 and/or the computing system 300 (e.g., via a management agent or remote access controller) may be configured to report software updates to the monitoring system 400. In another example, the monitoring engine 404 in the monitoring system 400 may be configured to retrieve any information about the computing devices 304-308 and/or the computing system 300, and then analyze that information to identify when software updates have been performed on the computing device(s) 304-308. In a specific example, an OME management console provided by the monitoring system 400 may monitor for inventory change events in the computing system 400 such as firmware changes reported by a remote access controller manager (e.g., an integrated DELL® Remote Access Controller (iDRAC) manager provided by DELL® Inc. of Round Rock, Tex., United States), driver changes reported by a host operating system registry and/or installation utilities via a service module (e.g., an integrated Service Module (iSM) provided in the iDRAC discussed above), network switch firmware inventories reported by a network switch, and/or other inventory change events that would be apparent to one of skill in the art in possession of the present disclosure. While a few specific examples have been provided, one of skill in the art in possession of the present disclosure will recognize that the updates of the computing device(s) in the computing system at block 602 may be performed in a variety of manners (and by the computing system itself or a monitoring system integrated with that computing system) while remaining within the scope of the present disclosure as well.

The method 600 then proceeds to block 604 where the monitoring system generates a blockchain transaction that is directed to a blockchain address and that identifies the update of the software in the computing device(s). In an embodiment, at block 604, the monitoring engine 404 in the monitoring system 400 may operate to generate a blockchain transaction that directed to a blockchain address and that identifies the update of the software in the computing device(s) 304-308. In a specific example, the blockchain transaction generated by the monitoring system 400 may include information identifying of the updated software on the computing device(s) 304-308, and may be directed to a blockchain address associated with the smart contract that was provided on the blockchain for the computing system 300 (as discussed above. In that specific example, the monitoring engine 404 in the monitoring system 400 may be configured to identify the blockchain address provided in the blockchain transaction at block 604 using the identity of the computing system 300 (e.g., via association(s) between computing system identifiers and blockchain addresses (associated with smart contracts for those computing systems) in the monitoring database 406.) However, in other embodiments, the blockchain transaction generated by the monitoring system 400 may include an identifier for the computing system 300 (e.g., that enables the determination of the blockchain address for the smart contract provided on the blockchain for that computing system 300 by, for example, the blockchain device 208*a-c*/500), an identification of each of the computing devices 304-308 in the computing system 300, an identification of the software provided on any or all of the computing devices 304-308 in the computing system 300, and/or any other information that one of skill in the art in possession of the present disclosure would recognize would allow for the enforcement of the software compliance as described herein. However, while a particular blockchain transaction has been described, one of skill in the art in possession of the present disclosure will recognize that a variety of different blockchain transactions will fall within the scope of the present disclosure as well.

The method 600 then proceeds to block 606 where the monitoring system broadcasts the blockchain transaction to blockchain device(s). In an embodiment, at block 606, the monitoring engine 404 in the monitoring system 400 may broadcast the blockchain transaction (via the communication system 408 and the network 206) such that it is received by the blockchain devices 208*a-c*/500. As such, at block 606, the monitoring system 400 may broadcast the blockchain transaction(s) discussed above anytime a software update is performed on any of the computing systems 202*a-c* (e.g., to any of the computing device(s) 304-308 in those computing systems 202*a-c*/300.) Furthermore, as discussed above, in some embodiments the functionality of the monitoring system 400 may be provided in each of the computing systems 202*a-c* and, as such, each of the computing systems 202*a-c* may be configured to broadcast a blockchain transaction each time a software update is performed on that computing solution 202*a-c*. While a few specific examples of the broadcasting of blockchain transactions has been described, one of skill in the art in possession of the present disclosure will recognize that blockchain transactions may be broadcast in a variety of manners that will fall within the scope of the present disclosure as well.

The method 600 then proceeds to block 608 where the blockchain device(s) execute a smart contract associated with the blockchain address included in the blockchain transaction. In an embodiment, at block 608, the blockchain engine 504 in any or all of the blockchain devices 208*a-c*/500 may receive the blockchain transaction broadcast by the monitoring system 204/400 at block 606 (e.g., via its communication system 508 and the network 204) and, in response, validate that blockchain transaction and access and execute the smart contract that was stored on the blockchain is association with the blockchain address to which that blockchain transaction is directed. For example, the validation of the blockchain transaction by the blockchain engine 504 in the blockchain devices 208*a-c*/500 at block 608 may include determining that the blockchain transaction satisfies consensus rules enforced by the blockchain devices 208*a-c*/500, determining that the blockchain transaction includes a required amount of a cryptocurrency fee, and/or performing a variety of other blockchain transaction validation operations that would be apparent to one of skill in the art in possession of the present disclosure. The validated blockchain transaction may then be included in a block that is appended to the blockchain as discussed above using, for example, proof-of-work methods, proof-of-stake methods, and/or other block-appending techniques that would be apparent to one of skill in the art in possession of the present disclosure.

The method 600 then proceeds to decision block 610 where the blockchain device(s) determine whether the smart contract indicates that the software update in the computing device(s) complies with a computing system software matrix. In an embodiment, at decision block 610, the execution of the code that provides the smart contract by blockchain engine 504 in the blockchain devices 208*a-c*/500 allows the blockchain devices 208*a-c* to determine whether the software update provided on the computing system 300 complies with a computing system software matrix defined by the smart contract for that computing system 300. As will be appreciated by one of skill in the art in possession of the present disclosure, the appending of the block that includes the blockchain transaction to the blockchain, as described above, provides for the accessing and execution of the code that provides the smart contract associated with the blockchain address that was included in that blockchain transaction.

With reference to the example code provided for the smart contract above, the execution of that code by the blockchain engine 504 in the blockchain devices 208*a-c*/500 may provide for the verification of an account of a user of the computing system for which the blockchain transaction was broadcast (e.g., by verifying that a username included in the blockchain transaction conforms to the blockchain identity and authentication mechanisms provided in the smart contract), the authorization of an account of a user of the computing system for which the blockchain transaction was broadcast (e.g., by verifying that a password included in the blockchain transaction matches a password associated with a username and private key managed and maintained by blockchain user account privacy policies), the verification of the computing system for which the blockchain transaction was broadcast (e.g., by verifying that an identifier of the computing system 300 included in the blockchain transaction is associated with a computing system identifier for the computing system participating in the system, which may be controlled by an enterprise security governance personnel using a whitelist approach that associates computing system identifiers, network addresses, and/or other unique computing system properties), and/or the determination of whether the software updates for the computing system 300 that are identified in the blockchain transaction comply with the computing system software matrix defined in the smart contract.

Using the example code for the smart contract provided above, the determination of whether the software updates for the computing system 300 that are identified in the blockchain transaction comply with the computing system software matrix defined in the smart contract may include a determination of whether a software version "9.5" is provided on a remote access controller (e.g., an iDRAC, Baseboard Management Controller (BMC), Out Of Band (OOB) controller, etc.) in the computing system 300, a software version "3.0" is provided on a network card (QLogic414262) in a networking device in the computing system 300, a software version "1.20.45a" is provided on a networking device "S41480" in the computing system 300, a software version "5.6.x" is provided on a storage device in the computing system 300, and a software version "9.2" is provided on a storage controller (PERC) in the storage device on the computing system 300. In this specific example, the network card (QLogic414262) in the on a networking device "S41480" in the computing system 300 may include the software (e.g., driver) version "3.0" that depends on the networking device "S41480" and, as discussed below, a change in that software (e.g., driver) version "3.0" may effect the interoperability of the network card (QLogic414262) with the on a networking device "S41480". However, while the example code for the smart contract reproduced above provides a computing system software matrix that includes a single set of software for each component, one of skill in the art in possession of the present disclosure will recognize that a computing system software matrix may identify a variety of different combinations of software for a computing system while falling within the scope of the present disclosure as well If, at decision block 610, the blockchain device(s) determine that the smart contract indicates that the software update in the computing device(s) does not comply with the computing system software matrix, the method 600 proceeds to block 612 where the blockchain device(s) store the blockchain transaction in a blockchain, and transmit a software non-compliance message to the monitoring system. In an embodiment, at block 612, the blockchain engine 504 in the blockchain device(s) 208*a-c*/500 may determine, via its execution of the smart contract as discussed above, that the smart contract indicates that the software update performed on the computing system 300 has provided software on the computing system 300 that does not comply with the computing system software matrix defined by the smart contract.

For example, at decision block 610, the execution of the smart contract by the blockchain engine 504 may indicate that the second software that replaced the first software providing the firmware 304*a* in the computing device 304 (e.g., to a new version of the firmware 304*a*, different firmware, etc.), in combination with the software provided for the other computing devices 306 and 308, does not comply with the computing system software matrix for the computing system 300. Similarly, at decision block 610, the execution of the smart contract by the blockchain engine 504 may indicate that the second software that replaced the first software providing the driver(s) 306*a* in the computing device 306 (e.g., to a new version of the driver(s) 306*a*, different driver(s), etc.), in combination with the software provided for the other computing devices 304 and 308, does not comply with the computing system software matrix for the computing system 300. Similarly, at decision block 610, the execution of the smart contract by the blockchain engine 504 may indicate that the second software that replaced the first software providing the firmware/driver(s) 308*a* in the computing device 308 (e.g., to a new version of the firmware/driver(s) 308*a*, different firmware/driver(s), etc.), in combination with the software provided for the other computing devices 304 and 306, does not comply with the computing system software matrix for the computing system 300. Using the specific example provided below, at decision block 610, it may be determined that the network card (QLogic414262) in the on a networking device "S41480" in the computing system 300 has been updated with software (e.g., driver) version "3.2" that replaces the software (e.g., driver) version "3.0" which, as discussed above, can effect the interoperability of the network card (QLogic414262) with the networking device "S41480". As such, the blockchain transaction indicating that failure of the software update on the computing system 300 to comply with the computing system software matrix for that computing system 300 will be stored in a corresponding block appended to the blockchain.

Furthermore, with reference to the example code for the smart contract provided above, the smart contract may provide for the transmittal of a software non-compliance message in response to the indication that a software update on a computing system fails to comply with the computing system software matrix for that computing system (e.g., "Compliance violation! Unauthorized changes not allowed!"). As such, at block 612, the blockchain engine 504 in the blockchain device 500 may transmit a software non-compliance message (e.g., via its communication system 508) through the network 508 to the monitoring system 204/400. While a specific example of a software non-compliance message has been described, one of skill in the art in possession of the present disclosure will recognize that the software non-compliance message transmitted at block 612 may include a variety of information (e.g., identifying the software update that does not comply with the computing system software matrix, identifying a software update that will bring the computing system back into compliance with the computing system software matrix, etc.) while remaining within the scope of the present disclosure.

The method 600 then proceeds to block 614 where the monitoring system causes an update of software in the computing device(s) that complies with the computing device software matrix. In an embodiment, at block 614, the monitoring engine 404 in the monitoring device 400 may be configured, in response to receiving the software non-compliance message from the blockchain device(s) 208*a*-*c*, to cause the computing system, which was determined to include software that is not in compliance with the computing system software matrix, be updated with software that complies with the computing system software matrix. However, while the causing of the updating of the computing system with software that complies with the computing system software matrix is described as being performed by the monitoring system 204/400 in response to receiving the software non-compliance message from the blockchain device 500, in other embodiments, the blockchain engine 504 in the blockchain device 500 may be configured to cause the computing system (which was determined to include software that is not in compliance with the computing system software matrix) to be updated with software that complies with the computing system software matrix directly and/or without participation of the monitoring system 400. For example, the smart contract may code that provides for the updating of the computing device(s) 304-308 on the computing system 300 with software that complies with the computing system software matrix, and thus the execution of that code may include causing the update of the software on the computing system 300 while remaining within the scope of the present disclosure as well.

As such, at block 614, the second software that replaced the first software providing the firmware 304*a* in the computing device 304 may then be replaced with third software (e.g., to a new version (i.e., upgrade) of the firmware 304*a*, an older version (i.e., downgrade) of the firmware 304*a*, etc.) that, in combination with the software provided for the other computing devices 306 and 308, complies with the computing system software matrix for the computing system 300. Similarly, at block 614, the second software that replaced the first software providing the driver(s) 306*a* in the computing device 306 may then be replaced with third software (e.g., to a new version (i.e., upgrade) of the driver(s) 306*a*, an older version (i.e., downgrade) of the driver(s) 306*a*, etc.) that, in combination with the software provided for the other computing devices 304 and 308, complies with the computing system software matrix for the computing system 300. Similarly, at block 614, the second software that replaced the first software providing the firmware/driver(s) 308*a* in the computing device 308 may then be replaced with third software (e.g., to a new version (i.e., upgrade) of the firmware/driver(s) 308*a*, an older version (i.e., downgrade) of the firmware/driver(s) 308*a*, etc.) that, in combination with the software provided for the other computing devices 304 and 306, complies with the computing system software matrix for the computing system 300. As such, if the execution of the smart contract indicates that the software update provided on the computing system 300 does not comply with the computing system software matrix, the monitoring system 400 (or the blockchain device 500 itself) causes a software update to the computing device(s) 304-308 that may provide a software upgrade or software downgrade on those computing device(s) 304-308 that will result in software on the computing system that complies with the computing system software matrix so that the interoperability, functionality, and/or performance of those computing devices is optimized for the computing system.

If, at decision block 610, the blockchain device(s) determine that the smart contract indicates that the software update in the computing device(s) complies with the computing system software matrix, the method 600 proceeds to block 616 where the blockchain device(s) store the blockchain transaction in the blockchain. In an embodiment, at block 616, the blockchain engine 504 in the blockchain device(s) 208*a*-*c*/500 may determine, via its execution of the smart contract as discussed above, that the smart contract indicates that the software update performed on the computing system 300 has provided software on the computing system 300 that complies with the computing system software matrix defined by the smart contract.

For example, at decision block 610, the execution of the smart contract by the blockchain engine 504 may indicate that the second software that replaced the first software providing the firmware 304*a* in the computing device 304 (e.g., to a new version of the firmware 304*a*, different firmware, etc.), in combination with the software provided for the other computing devices 306 and 308, complies with the computing system software matrix for the computing system 300. Similarly, at decision block 610, the execution of the smart contract by the blockchain engine 504 may indicate that the second software that replaced the first software providing the driver(s) 306*a* in the computing device 306 (e.g., to a new version of the driver(s) 306*a*, different driver(s), etc.), in combination with the software provided for the other computing devices 304 and 308, complies with the computing system software matrix for the computing system 300. Similarly, at decision block 610, the execution of the smart contract by the blockchain engine 504 may indicate that the second software that replaced the first software providing the firmware/driver(s) 308*a* in the computing device 308 (e.g., to a new version of the firmware/driver(s) 308*a*, different firmware/driver(s), etc.), in combination with the software provided for the other computing devices 304 and 306, complies with the computing system software matrix for the computing system 300. As such, the blockchain transaction indicating that the software update on the computing system 300 complies with the computing system software matrix for that computing system 300 will be stored in a corresponding block appended to the blockchain. One of skill in the art in possession of the present disclosure will recognize that the storage of the blockchain transactions on the blockchain at either of blocks 612 and 616 provides an immutable record of software updates on the blockchain that may be analyzed to determine software changes made on any computing system/solutions utilized in the system 200.

Thus, systems and methods have been described that provides blockchain-based smart contracts for use in ensuring computing devices in a computing system/solution comply with a computing solution software matrix that ensures optimal interoperability, functionality, and performance of the computing solution. A monitoring device detects when computing device(s) in the computing system/solution experience a software update and, in response, generates and transmits a blockchain transaction that identifies the software update provided on the computing device(s). That blockchain transaction is directed to a blockchain address that is associated with a smart contract that has been provided on a blockchain in order to ensure software compliance for that computing system/solution, and blockchain device(s) receiving that blockchain transaction will then access and execute the smart contract associated with the blockchain address, and determine whether the execution of that smart contract indicates that the software update of the computing device(s) in the computing system/solution complies with the computing solution software matrix. If the software update of the computing device(s) in the computing system/solution does not comply with the computing solution software matrix, the blockchain device may cause the computing device(s) to be updated with different software that complies with the computing solution software matrix. As such, the optimal interoperability, functionality, and performance of the computing solution is maintained.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A blockchain-based software compliance system, comprising:
    a computing system that includes a plurality of computing devices, wherein a first computing device included in the plurality of computing devices is associated with first software;
    a monitoring system that is coupled to the computing system and that is configured to:
        detect a first update to the first computing device that replaces the first software with second software and, in response, generate a blockchain transaction that is directed to a blockchain address and that identifies the first update of the first computing device to replace the first software with the second software; and
        broadcast the blockchain transaction; and
    a blockchain device that is coupled to the monitoring system and that is configured to:
        receive the blockchain transaction broadcasted by the monitoring system;
        determine, by executing a smart contract associated with the blockchain address, that the second software that replaced the first software is in a non-compliance with a computing system software matrix,
        wherein the non-compliance of the second software with the computing system software matrix is based on the second software affecting interoperability of the first computing device with a fourth software provided on a second computing device that is included in the plurality of computing devices, and
        wherein a compliance of the second software with the computing system software matrix includes the second software not affecting interoperability of the first computing device with a fifth software provided on the second computing device; and
        cause, in response to the execution of the smart contract associated with the blockchain address determining that the second software that replaced the first software does not comply with the computing system software matrix based on the second software affecting the interoperability of the first computing device with the fourth software provided on the second computing device, a second update to the first computing device that replaces the second software with third software that complies with the computing system software matrix.

2. The system of claim 1, wherein the monitoring system is configured to:
    identify, in response to detecting that the first computing device has been updated to replace the first software with the second software, the blockchain address based on the computing system.

3. The system of claim 1, wherein the blockchain transaction identifies the each of the plurality of computing devices, and software associated with each of the plurality of computing devices.

4. The system of claim 1, wherein the blockchain device is configured to cause the second update to the first computing device that replaces the second software with the third software by:
    transmitting a software non-compliance message to the monitoring system that indicates that the second software that replaced the first software to update the first computing device does not comply with a computing system software matrix, and wherein the monitoring system is configured to:
        cause, in response to receiving the software non-compliance message, the second update to the first computing device that replaces the second software with third software that complies with the computing system software matrix.

5. The system of claim 1, wherein the second update to the first computing device that replaces the second software with the third software that complies with the computing system software matrix provides a software downgrade in the first computing device.

6. The system of claim 1, wherein the second update to the first computing device that replaces the second software with the third software that complies with the computing system software matrix provides a software upgrade in the first computing device.

7. The system of claim 1, further comprising:
    a datacenter that includes the computing system, the monitoring system, and a blockchain system that includes the blockchain device.

8. An Information Handling System (IHS), comprising:
a blockchain device that is coupled to a network and that includes:
  a blockchain device processing system; and
  a blockchain device memory system that is coupled to the blockchain device processing system and that includes instructions that, when executed by the blockchain device processing system, cause the blockchain device to:
    receive a blockchain transaction that was broadcast by a monitoring system in response to a first update of a first computing device in a computing system to replace first software associated with the first computing device with second software;
    determine, by executing a smart contract associated with a blockchain address that is included in the blockchain transaction, that the second software that replaced the first software is in a non-compliance with a computing system software matrix,
    wherein the non-compliance of the second software with the computing system software matrix is based on the second software affecting interoperability of the first computing device with a fourth software provided on a second computing device that is included in a plurality of computing devices, and
    wherein a compliance of the second software with the computing system software matrix includes the second software not affecting interoperability of the first computing device with a fifth software provided on the second computing device; and
    cause, in response to the execution of the smart contract associated with the blockchain address determining that the second software that replaced the first software does not comply with the computing system software matrix based on the second software affecting the interoperability of the first computing device with the fourth software provided on the second computing device, a second update to the first computing device that replaces the second software with third software that complies with the computing system software matrix.

9. The IHS of claim 8, wherein the smart contract that is associated with the blockchain address is also associated with the computing system.

10. The IHS of claim 8, wherein the blockchain transaction identifies the each of a plurality of computing devices included in the computing system, and software associated with each of the plurality of computing devices.

11. The IHS of claim 8, wherein the instructions, when executed by the blockchain device processing system, cause the blockchain device to:
  transmit a software non-compliance message to the monitoring system that indicates that the second software that replaced the first software to update the first computing device does not comply with a computing system software matrix, and wherein the software non-compliance message is configured to cause the monitoring system to:
    cause the second update to the first computing device that replaces the second software with third software that complies with the computing system software matrix.

12. The IHS of claim 8, wherein the second update to the first computing device that replaces the second software with the third software that complies with the computing system software matrix provides a software downgrade in the first computing device.

13. The IHS of claim 8, the second update to the first computing device that replaces the second software with the third software that complies with the computing system software matrix provides a software upgrade in the first computing device.

14. A method for providing blockchain-based software compliance, comprising:
  detecting, by a monitoring system that is coupled to a computing system that includes a plurality of computing devices, a first update to a first computing device included in the plurality of computing devices that replaces first software, associated with the first computing device, with second software;
  generating, by the monitoring system in response to detecting that the first computing device has been updated to replace the first software with second software, a blockchain transaction that is directed to a blockchain address and that identifies the first update of the first computing device to replace the first software with the second software;
  broadcasting, by the monitoring system, the blockchain transaction;
  receiving, by a blockchain device that is coupled to the monitoring system, the blockchain transaction broadcasted by the monitoring system;
  determining, by executing a smart contract associated with the blockchain address that is included in the blockchain transaction, that the second software that replaced the first software is in a non-compliance with a computing system software matrix,
  wherein the non-compliance of the second software with the computing system software matrix is based on the second software affecting interoperability of the first computing device with a fourth software provided on a second computing device that is included in the plurality of computing devices, and
  wherein a compliance of the second software with the computing system software matrix includes the second software not affecting interoperability of the first computing device with a fifth software provided on the second computing device; and
  causing, by the blockchain device and in response to the execution of the smart contract associated with the blockchain address determining that the second software that replaced the first software does not comply with the computing system software matrix based on the second software affecting the interoperability of the first computing device with the fourth software provided on the second computing device, a second update to the first computing device that replaces the second software with third software that complies with the computing system software matrix.

15. The method of claim 14, further comprising:
  identifying, by the monitoring system in response to detecting that the first computing device has been updated to replace the first software with the second software, the blockchain address based on the computing system.

16. The method of claim 14, wherein the blockchain transaction identifies the each of the plurality of computing devices, and software associated with each of the plurality of computing devices.

17. The method of claim 14, wherein the causing the second update to the first computing device that replaces the second software with third software includes:
- transmitting, by the blockchain device to the monitoring system, a software non-compliance message that indicates that the second software that replaced the first software to update the first computing device does not comply with a computing system software matrix; and
- causing, by the monitoring system in response to receiving the software non-compliance message, the second update to the first computing device that replaces the second software with third software that complies with the computing system software matrix.

18. The method of claim 14, wherein the second update to the first computing device that replaces the second software with the third software that complies with the computing system software matrix provides a software downgrade in the first computing device.

19. The method of claim 14, wherein the second update to the first computing device that replaces the second software with the third software that complies with the computing system software matrix provides a software upgrade in the first computing device.

20. The method of claim 14, wherein each of the computing system, the monitoring system, and a blockchain system that includes the blockchain device are included in a datacenter.

\* \* \* \* \*